United States Patent
Braudaway et al.

(10) Patent No.: US 6,807,634 B1
(45) Date of Patent: Oct. 19, 2004

(54) WATERMARKS FOR CUSTOMER IDENTIFICATION

(75) Inventors: Gordon W. Braudaway, Yorktown Hts., NY (US); Marco Martens, Chappaqua, NY (US); Frederick C. Mintzer, Shrub Oak, NY (US); James B. Shearer, Ossining, NY (US); Charles P. Tresser, Mamaroneck, NY (US); Chai W. Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/449,618

(22) Filed: Nov. 30, 1999

(51) Int. Cl.[7] .............................................. H04L 9/00
(52) U.S. Cl. ...................................... 713/176; 380/54
(58) Field of Search .......................... 707/1–3; 380/54; 713/176

(56) References Cited

U.S. PATENT DOCUMENTS

| | | | |
|---|---|---|---|
| 5,845,276 A | * 12/1998 | Emerson et al. | ................ 707/2 |
| 5,991,426 A | * 11/1999 | Cox et al. | .................... 382/100 |
| 6,226,618 B1 | * 5/2001 | Downs et al. | ................. 705/1 |
| 6,229,924 B1 | * 5/2001 | Rhoads et al. | .............. 382/232 |
| 6,272,634 B1 | * 8/2001 | Tewfik et al. | ............... 713/176 |

FOREIGN PATENT DOCUMENTS

| EP | 0 933 919 A2 | 8/1999 |
|---|---|---|
| WO | WO 97/34391 | 9/1997 |
| WO | WO 99/10858 | 3/1999 |

OTHER PUBLICATIONS

Mintzer, Fred, Jeffrey Lotspiech, and Norishige Morimoto. "Safeguarding Digital Library Contents and Users: Digital Watermarking" D–Lib Magazine (Dec. 1997) (http:dlib.org/dlib/december97/ibm/12lotspiech.html).*
D. Boneh and J. Shaw. Collusion–Secure Fingerprinting for Digital Data. In Advances in Cryptology—CRYPTO 95, pp. 452–465, 1995.*
E. Ferrill and M. Moyer. A Survey of Digital Watermarking. Feb. 25, 1999.*
United Kingdom Search Report, dated May 8, 2001.
Lu et al., "Cocktail Watermarking for Digital Image Protection", *IEEE Transactions on Multimedia*, vol. 2, No. 4, pp. 209–224, Dec. 2000.

* cited by examiner

*Primary Examiner*—Ayaz Sheikh
*Assistant Examiner*—Michael Vaughan
(74) *Attorney, Agent, or Firm*—Whitham, Curtis & Christofferson, P.C.; Stephen C. Kaufman (57) ABSTRACT

A digital watermarking method encodes different pairs of watermarks into each of a plurality of images offered for use by a vendor. The watermarks in each pair are derived from two separate collections of watermarks and sufficiently different so as to prevent false positives. Because each pair of watermarks is assigned to a different customer relative to a particular image, unauthorized use of a digital image sold to a customer may be determined by locating the associated pair of watermarks assigned to the customer in the image. Collusion detection is also realized by forming each pair of masks from sub-collections of masks which are detectable in an image formed by combining the same images sold to one or more customers.

20 Claims, 4 Drawing Sheets

WATERMARKS FOR CUSTOMER IDENTIFICATION

BACKGROUND OF THE INVENTION

1. Field of the Invention

The present invention generally relates to imperceptible watermarking of images, and more particularly to a digital watermarking method that performs positive identification of customers who purchase and publish images.

2. Background Description

An imperceptible watermark is defined as an alteration of a data set which is, for the most part, imperceptible to a human i.e., the watermark should be invisible or almost invisible, but can be recognized by a machine such as a computer. The general principle of developing a watermark is disclosed, for example, by M. M. Yeung et al. in "Digital Watermarking for High-Quality Imaging", *Proceedings of the IEEE Signal Processing Multimedia Workshop*, Princeton, N.J. (1997).

A robust watermark is one conceived to survive modifications of the image, and more precisely, to still be detectable when the image has been modified to some reasonable extent. Robust watermarks are usually required to be non-removable by an adverse party, at least not removable without visible distortion to the image. They are usually designed, for instance, to establish ownership or to help protect copyrights. In several cases, one expects them to be detectable when the image is transferred to the analog world, such as when printed or transformed into analog signals such as required for display on a TV screen.

Watermarks cannot be replaced by digital signatures in this context, as known signature schemes with no visible trace on the image do not resist transfer from the digital to analog world. Because of the dual constraint of invisibility and resistance to minor changes in the image, robust watermark detection is therefore based on statistical analysis: any individual components of a mark can be altered by attack and/or by digital/analog (or D/A) conversion so that one is reduced to check that traces of the overall mark persist.

In general, a robust watermark consists of an array $M(K)$ of elements, $M(K)(h,v)$ defined by a cryptographically designed key $K$. Here, $h$ and $v$ stand respectively for horizontal and vertical coordinates. According to one technique for generating a robust watermark, $M(K)$ is a matrix of "0's" and "1's", where a zero means a pixel gets brighter, and a 1 in the matrix means a pixel gets darker after watermarking (one can have a richer set of possibilities where, for instance, a "2" in the matrix means that no change is made.) The watermark $M(K)$ (referred to as a "mask") is used to modify some pixels attributes according to some algorithm, defining some function $F$, which generates the modified pixel attribute $m(h,v)$ at location $(h,v)$ as a function of the mask $M$, the pixel's attribute before marking $A(h,v)$, and the attributes before marking $An(h,v)$ of neighboring pixels, i.e., $$m(h,v)=F(M(K)(h,v), A(h,v), An(h,v)).$$

The amount by which watermarking modifies the luminosity at a given pixel is not necessarily uniform for better visual performance and/or for better resistance to attacks. Because the image and the accompanying watermark are expected to suffer some modifications, the key $K$, as well as the function $F$, are usually chosen as secret keys: a description of cryptographic techniques, with directions on how to use several of their implementations, can be found in *Handbook of Applied Cryptography* by Alfred J. Menezes, Paul C. van Oorschot and Scott A. Vanstone, CRC Press, 1997.

An example of robust invisible robust watermark has been disclosed, for instance, in U.S. Pat. No. 5,825,892 issued to Mintzer and Braudaway.

Problem to be Solved

An aim of the present invention is to address the following business case. Suppose an image vendor (whom we will call The Ven Company in this hypothetical) sells digital images to a pool of customers $C_1, C_2, \ldots, C_N$. In fact not all images are necessarily sold to all customers. Each customer indeed only buys the right to print these images in some publications. No customer has the right to circulate or sell digital form of the images.

The Ven Company wants to prevent unauthorized resale of these images. In particular, if one of the images is found in some publication not listed by any customer, The Ven Company will legitimately suspect that one of its customers has broken his contract. It would therefore be advantageous for The Ven Company to identify the customer in its pool which has acted in this way, so that The Ven Company can pursue legal remedies including suing the customer for injunctive relief to prevent the unauthorized publication and/or damages, terminate its business relationship with this customer, or both.

In principle, this problem may be addressed using a robust invisible watermark scheme as defined above. However, given an image carrying a watermark, $W_i$, belonging to a large collection $W_1, W_2, \ldots, W_m$, recognizing which one of these marks has been used, if any, is difficult and time consuming. To segregate among different customers, the number, $m$, of watermarks needs to be as large as the maximum number of customers that The Ven Company expects for its best selling digital images, Also, because of the statistical nature of robust watermark detection, detection can be unreliable for large $m$, and careless use of watermarks could lead to a false positive identification, leading to potentially embarrassing problems with non-offending customers. On the other hand, the problem of a false negative is, in principle, solved by the intrinsic qualities of the watermarking scheme used, and therefore reduces the problem To selecting which mark is used out of a large collection.

A well knows kind of attack on watermarks in a situation as described above is collusion of several customers. This can be described as follows: assume customers $Ci_1, Ci_2, \ldots, Ci_n$ all buy the same image I, which has been watermarked with different marks $Wi_1, Wi_2, \ldots, Wi_n$, so that they receive image files $Ii_1, Ii_2, \ldots, Ii_n$, respectively. These customers can together create a new image file Ic (where c stands for collusion) where each pixel $(h,v)$ is defined by a combination of averaging and random choices among the $(h,v)$ pixels of all images $Ii_1, Ii_2, \ldots, Ii_n$. It has been recognized that arbitrary collusions will defeat watermarking. Prior work can be found on protection against collusion attacks, such as "Collusion secure fingerprinting for digital data" by D. Boneh, and J. Shaw, *IEEE Transactions on Information Theory*, Vol 44, No. 5, pp. 1897–1905,(1998).

SUMMARY OF THE INVENTION

It is an object of the present invention to provide an improved method for encoding a watermark into a digital image, so that a person who engaged in an unauthorized use of th digital image may be identified with greater accuracy compared with conventional methods.

It is another object of the present invention to provide an improved method for detecting when an unauthorized digital image has been formed as a result of collusion between or among cuts of a digital image vendor, and then to identify the colluding parties with greater accuracy compared with conventional methods.

It is another object of the present invention to provide a method of the aforementioned types which significantly reduces the number of processing steps required to determine the customer or customers who engaged in an unauthorized use of a digital image.

It is a further object of the present invention to provide a method for performing collusion detection based on an analysis of several images sold to one or more customers.

These and other objects of the invention are achieved by providing a digital watermarking method which encodes two watermarks, or masks, into a digital image offered for use by a vendor. The method may advantageously be applied for watermark detection alone, or may also be used to perform collusion detection among two or more customers. The type of watermarks and the manner in which the watermarks are encoded are determined accordingly.

In accordance wit a first embodiment of the method for performing watermark detection, first and second collections of masks are formed, a from each collection is chosen to form a pair of masks, and the pair of masks are then encoded into the digital image. Next, a digital image suspected of being an unauthorized version of the encoded digital image is obtained. The suspected image is then compared with the masks in the first and second collections on a mask-by-mask basis. If the first and second masks of the pair are found in the image, the customer who distributed the unauthorized version of the encoded digital image may easily be determined, since each pair of masks has beforehand been assigned to one and only one customer. The masks in the first and second collections may be formed according to a random process. Further, in order to prevent a false positive, the masks in the first and second collections must be different as determined by a predetermined criteria, e.g., at least one third of the values in each mask must be different from the values in the other masks.

In order to reduce the number of comparisons required to detect the watermarks in a suspected unauthorized image, the number of masks in both collections are preferably the same. As a result, the present method performs recognition among N customers while performing at most $2\sqrt{N}$ tests for the case when there is no collusion, and recognizes frequent collusions of two or more customers. (For purposes of this invention, $\sqrt{X}$ stands for smallest integer larger or equal to The square root of X).

According to a second embodiment of the present invention applied for collusion detection, first and second collections of masks are formed each including a sub-collection of masks of a first type and a sub-collection of masks of a second type. A plurality of pairs of masks are then assigned to each of a plurality of customers, with each pair of masks assigned per customer corresponds to a different one of a plurality of digital images $I_j$ offered for use by the vendor. The first mask in each pair is derived from the first collection and the second mask is derived from the second collection, with the first mask and the second mask either both being the first type or both being of the second type. The pair of masks is then encoded into a digital image authorized for use by the associated customer.

The first and second collections of masks are formed in accordance with steps that include: a) defining at least one initial mask in a temporary collection, b) choosing a plurality of patterns for the digital images, each of the patterns chosen for a subset of pixels in a respective one of the digital images, c) generating a first tentative mask as a possible mask to be added to the temporary collection; d) modifying the first tentative mask to carry one of said patterns Pat(j) for a subset $S_j$ of pixels (h,v) within digital image $I_j$, e) generating a second tentative mask which is the same as the first tentative mask except that the second tentative mask carries a pattern which is an inversion Pat'(j) of the pattern Pat(j) carried by the first tentative mask, f) comparing the first tentative mask and the second tentative mask to the masks already in the temporary collection, g) rejecting the first tentative mask and The second tentative mask if a predetermined correspondence exists between at least one of the first tentative mask and the second tentative mask and any of the masks in the temporary collection, and h) adding the first tentative mask and the second tentative mask to the temporary collection if the predetermined correspondence does not exist between both the first tentative mask and the second tentative mask and any of the masks in the temporary collection.

Steps c)–h) are then repeated until a desired number of masks are included in the temporary collection. The temporary collection is then divided into two groups corresponding, respectively, to the first collection and the second collection, where the sub-collection of the first type in the first collection and the second collection includes masks which carry patterns Pat(j) and the sub-collection of the second type includes masks which carry patterns Pat'(j).

To determine the customers who colluded to form the suspected unauthorized image, one of the following symbolic sequences $s1(j,C_i)$ for each of the vendor's customers:

$s1(j, C_i)=0$ if $C_i$ has not bought image $I_j$, $s1(j, C_i)=1$ if Image $I_j$ sold to $C_i$ has watermarks of type A, $s1(j, C_i)=2$ if Image $I_j$ sold to $C_i$ has watermarks of type B.

An output $S_j$ is then computed for all possible pairs of customers based on the symbolic sequences. The output $S_j$ for all possible pairs of customers are then compared to the suspected image, and the partes who colluded are determined based on an outcome of the comparing step.

Another embodiment of the present method for performing collusion detection is similar to the foregoing embodiment except that instead of using sub-collections, masks are formed for respective customers. Each mask (M) corresponds to a two-dimensional concatenation of two smaller masks. The second smaller mask (Ms') is an inversion of the first smaller mask (Ms). Further, a correlation is drawn between the first mask and a first letter of an alphabet, as well as between the second mask and a second letter of the alphabet. Mask (M) is then regarded as a code word written in the first and second letters.

According to another embodiment of the present method for performing watermark detection based on more than one image, n collections of watermarks are formed, a set of a watermarks W(i) are assigned to each customer with the n watermarks being chosen from the n collections of watermarks, respectively, a different one of the watermarks from the set W(i) is encoded into respective images, and the images are sold to a single customer. A group of images suspected of being unauthorized versions of the images used by the customer are then obtained, a predetermined number in the group are analyzed, and the group of images is identified as being derived from the customer when watermarks are found in the predetermined number of images in the group.

According to another embodiment of the present method for performing collusion detection, n collections of watermarks are formed, watermarks are randomly chosen from the n collections, and the randomly chosen watermarks are encoded into respective ones of a plurality of images. At least two customers are then authorized to use the images, with at least a portion of the images being encoded with a common watermark. A group of suspected images is then obtained, analyzed to determine which images in the group have the common watermark, and parties to the collusion are determined based on the images containing the common watermark.

Further, any of the methods of the present invention may advantageously be embodied in a computer program adapted for execution on either a general purpose or special purpose computer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In accordance with the present invention, watermarks are chosen and then attributed to customers based on principles of coding theory. Let $i=1, 2, \ldots, N$ be an index designating customer $C_i$ and $j=1, 2, \ldots$ be an index designating picture $I_j$ before watermarking. The present method marks an image with two watermarks and then recovers both marks, when dealing with image $I_j$, by associating to each customer $C_i$ a pair of masks given by:

$$(M(K(i,j,1)), M(K(i,j,2))),$$

where $M(K(i,j,1))$ belongs to some collection Col(1) which may or not depend on j, and $M(K(i,j,2))$ belongs to some (preferably disjoint) collection Col(2) which also, independently, may or not depend on j.

Because a square is the largest area rectangle with a given perimeter, it is more economical and thus preferable to choose Col(1) and Col(2) as having the same number, Elem, of elements. Then, there are $N'=Elem^2$ possible pairs (assuming Col(1) and Col(2) are disjoint collections) and one can discriminate between N' possible customers. For simplicity, we will assume that N=N' in the sequel with no significant loss of generality. Then, in order to recognize a customer, one will only have to perform at most 2Elem trials to recognize the pair of masks $(M(K(i,j,1)), M(K(i,j,2)))$. By using coding theory to determine the collections Col(1) and Col(2), the present invention also provides protection against collusion attack, in the manner described in the discussion which follows.

Figure 1:
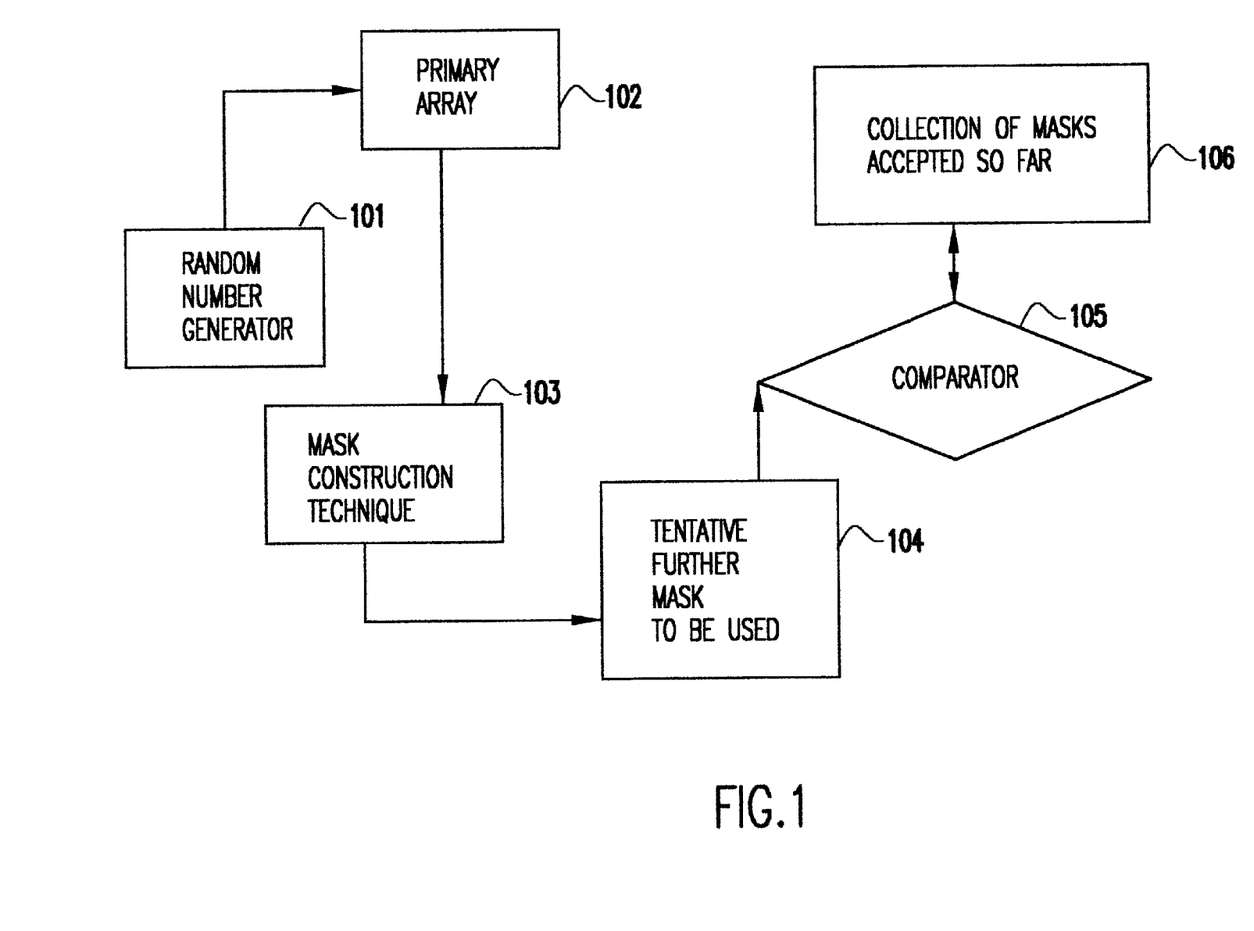
FIG. 1 is a flow diagram illustrating a method to construct collections Col(1) and Col(2)

Referring now to the drawings, and more particularly to FIG. 1, the collections Col(1) and Col(2) are formed by constructing masks using a random process and rejecting any mask too close to the masks already selected. More precisely, some random generator 101 is used to generate an array of 0's and 1's at 102. Using some preferred method to generate masks at 103, such as the one described in U.S. Pat. No. 5,825,892 issued to Mintzer and Braudaway, the contents of which is hereby incorporated by reference, a tentative mask is generated at 104. Using comparator 105, tentative mask 104 is compared to all masks already selected in the union of Col(1) and Col(2) constructed so far at temporary collection 106. If tentative mask 104 is too close to at least one mask of temporary collection 106 (where too close depends on the application, but can be set for instance to one third of the total number of values in a mask), the mask is rejected; otherwise, it is added to collection 106, and the overall process stops when N masks have been selected. Thus, coding theory will first be used to choose all elements of the union of Col(1) and Col(2) to be sufficiently different. For instance, it is easy to ensure that any two elements chosen from these two collections will differ on at least one third of their entries. Such consideration will be preferable to avoid false positive identifications.

When composing collections Col(1) and Col(2), which is easily done by random trials and rejection of bad cases, one can impose a further restriction which will serve to detect images produced as a result of a collusion between two customers. To that effect, we choose, for each j, a subset $S_j$ of the values of (h,v). A pattern Pat(j) of "0's" and "1's" is chosen. A pattern Pat'(j) is then obtained by changing each entry of Pat(j) to 1 minus this entry (so that 1 turns to 0 and 0 turns to 1). Half of the elements of Col(1) and Col(2) will carry Pat(j) on $S_j$, the other halves carrying Pat'(j).

Thus, both Col(1) and Col(2) are cut in two halves, say Col(1) decomposes as the disjoint union of Col(1)A and Col(1)B, wile Col(2) decomposes as the disjoint union of Col(2)A and Col(2)B. Here, A corresponds to Pat(j) being carried on Sj, while B corresponds to Pat'(j) being carried on $S_j$. To customer $C_i$, we will then assign a pair of watermarks both of type A, or both of type B.

Figure 2:
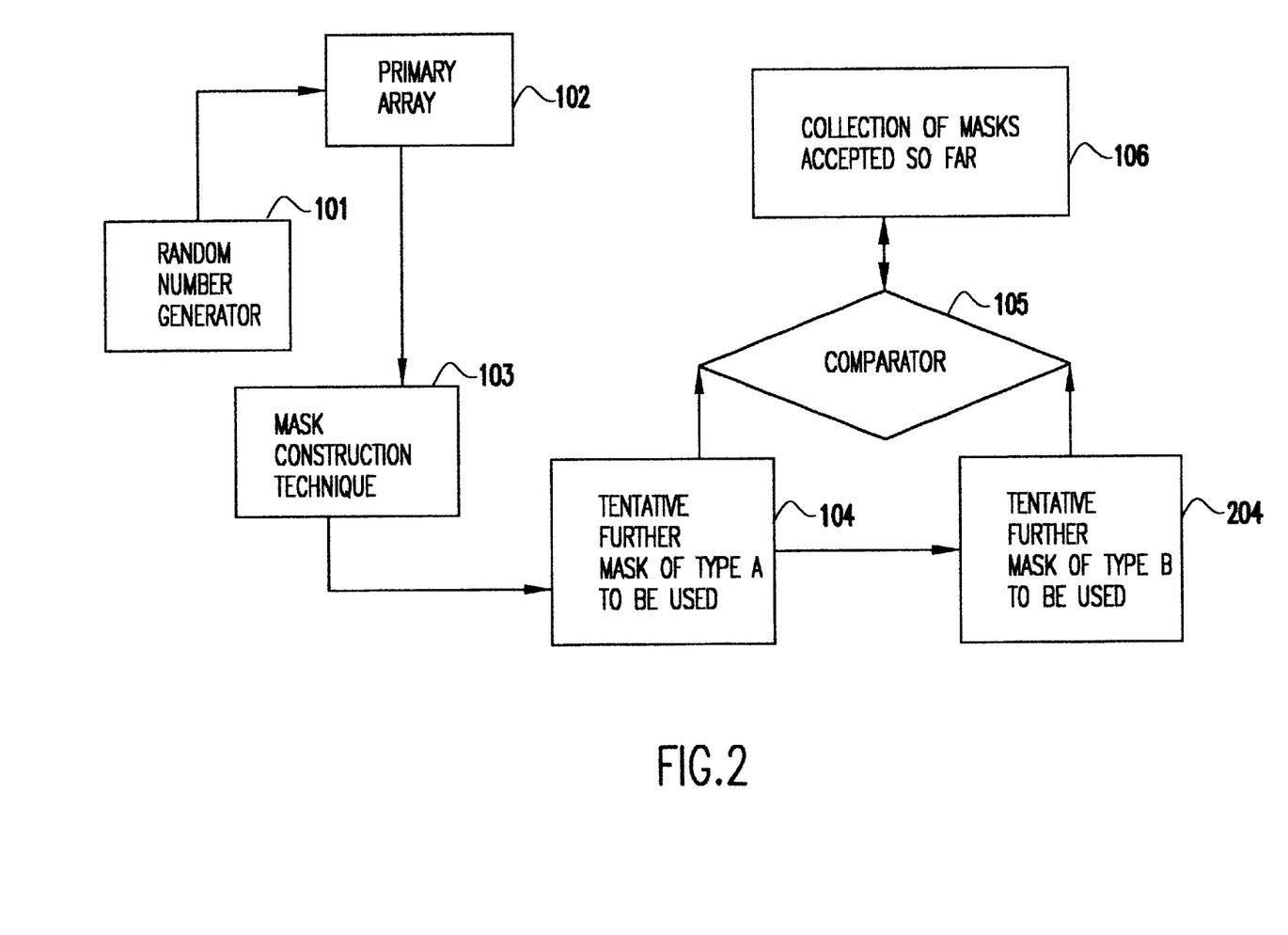
FIG. 2 is a flow diagram showing how sub-collections A and B are constructed in accordance with the present invention.

With reference now to FIG. 2, there is illustrated how this process of constructing sub-collections A and B is implemented. All steps are identical to what is illustrated in FIG. 1, except that after one tentative mask is constructed at 104 for A, a second mask is constructed at 204 for B, by only inverting the elements of $S_j$ as described above. Then, both masks (for A and for B) are simultaneously accepted or rejected in comparator 105. When two customers collude, the $S_j$ of the image they produce by collusion carries;

Pat(j) if they are both in A

Pat'(j) if they are both in B

Neither of the above otherwise.

Figure 3:
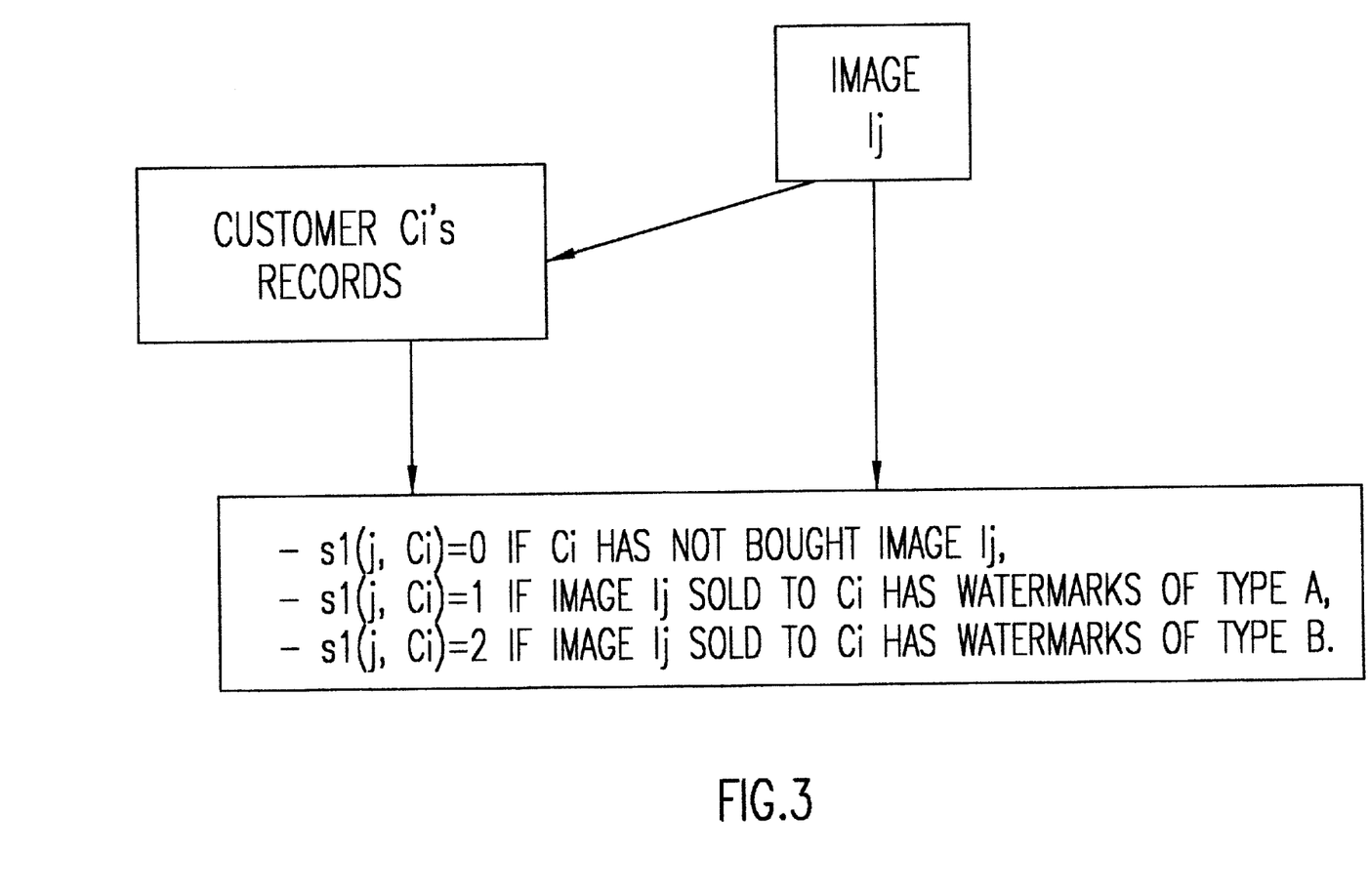
FIG. 3 is a flow diagram showing how symbolic sequence $s1(j, C_i)$ are constructed for customers in accordance with the present invention.

As indicated in FIG. 3, one constructs a symbolic sequence $s1(j, C_i)$ for each customer, by setting:

$s1(j, C_i)=0$ if $C_i$ has not bought image $I_j$, $s1(j, C_i)=1$ if image $I_j$ sold to $C_i$ has watermarks of type A, $s1(j, C_i)=2$ if image $I_j$ sold to $C_i$ has watermarks of type B.

Once these sequences are computed, one can easily compute what would be the output on $S_j$ of each pair of customers, and even of more complex combinations of them. In case only one pair of customers collude for some long series of images (which need not be consecutive), the pair will be easily discovered, assuming the A–B partitions are made efficiently so as to generate $s1(j, C_i)$ which diverges promptly from one customer to the next one as j increases. For instance, a way to organize this partition as j evolves is depicted in FIG. 1.

If more than one pair of customers collude, the recognition is not as easy, but one can easily restrict the list of suspects and then reorganize further partitions so as to catch the wrongdoers. From classical coding theory, it is evident that the restriction on marks imposed by limiting the freedom on Sj leaves a large number of codes apart from each other. Let P denote the number of entries of the matrices M (where M stands for a mask such as M(K(i,j,1)) or M(K(i,j,2))). Recall that $S_j$ contains some number of entries of the matrices M, say a third, i.e., the size of $S_j$ is P/3. As we deal now with rough estimates, we assume that P is a multiple of 6 and set P=3P'=6P". Using these notations, we previously suggested that different codes in the union of Col(1) and Col(2) differs in at least P' bits. The number of binary codes of length L which are d apart is usually denoted by A(L,d). The number of binary codes of length L with Q "1's" which are d apart is usually denoted by A(L,d,Q): both concepts are discussed at length in the coding literature (see, e.g., "The Theory of Error Correcting Codes", North-Holland Mathematical Library, V.16, by Florence J. Macwilliams and Neil J. A. Sloane, North-Holland, Amsterdam (1977)). Under the constraints we imposed, the freedom of choice that we have for matrices M is measured as A(3P',P'). A(3P',P') is quite large when P' is in the order of hundreds as in any high resolution image application (more generally, A($\alpha$P',P') grows exponentially with respect to P' when $\alpha$>2). Even if one wants to have about half of the entries of the matrix out of $S_j$ to be "1's", the number of possible choice is quite big as it is given by A(($\alpha$P',P',P') for $\alpha$ close to 2. One can consult Chapter 17 and Appendix A of the previously mentioned book by Macwilliams and Sloane for lower bound estimates of these numbers which confirm these statements.

Figure 4:
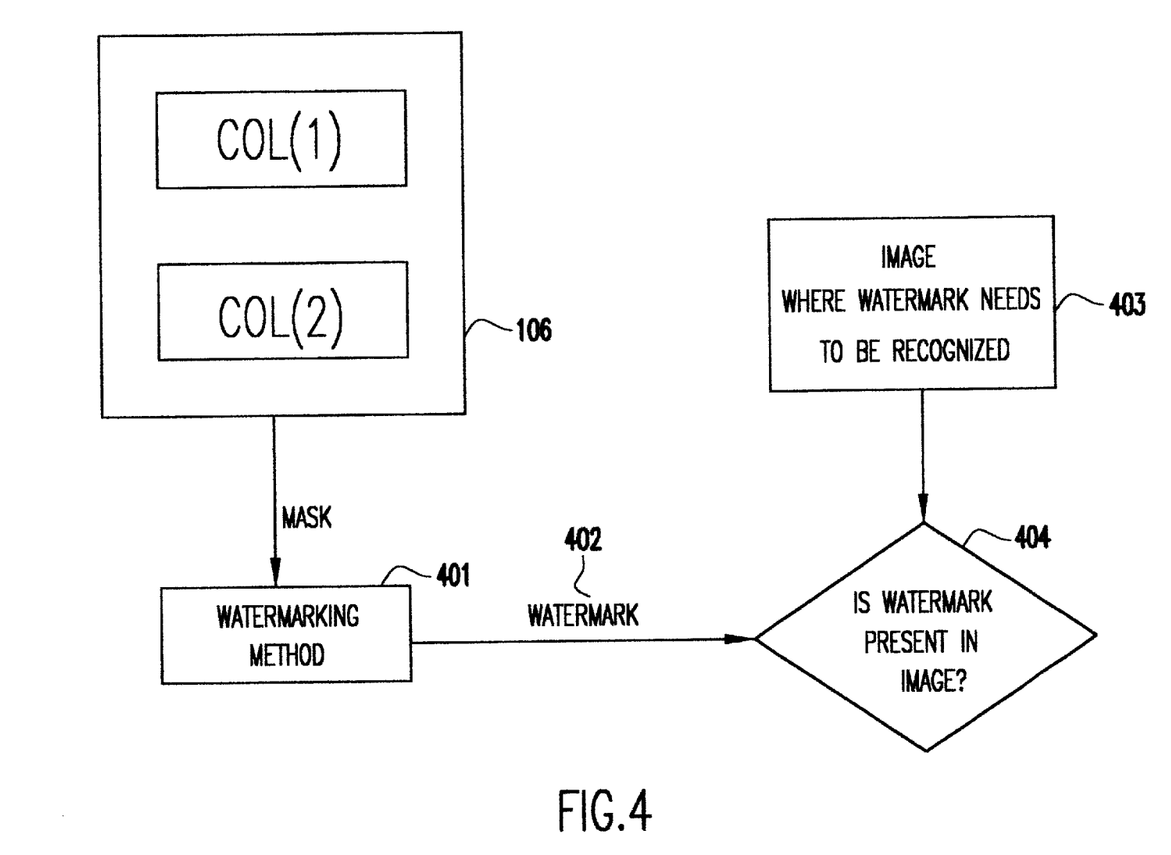
FIG. 4 is a flow diagram showing how checkings may be performed for recognizing the manner in which an image has watermarked in accordance with the present invention.

As disclosed previously, using two watermarks from a pair of collections of watermarks reduces considerably the number of checkings which have to be made on average to recognize how an image has been watermarked. More precisely, as described in FIG. 4, only at most 2×Elem tests need to be made: one selects the masks one by one from the two collections Col(1) and Col(2) at 106, each containing Elem masks. The selected mask is then used in 401 to construct a watermark 402 according to the watermarking method. The presence of this watermark in the image 403 is then tested in decision block 404. Clearly, more than two marks put together would shorten even more the verification.

An alternate embodiment of the method of the present invention uses some of the concepts discussed above to watermark differently several copies of a given image. The basic principle that different marks should correspond to M's far apart should be observed, and the use of the system based on the triple ($S_j$,Pat(j),Pat'(j)) can still be used. In fact, these principles together allow for reasonable results. We will indicate a specific way to generate different codes so that these codes are still quite different if restricted to a reasonably large portion of the image. The method we next describe can indeed also be used for composing the collections Col(1) and Col(2) discussed previously.

According to this method, each M will be conceived as a two-dimensional concatenation of smaller matrices. One can then use only a single small, matrix Ms together with the matrix Ms'=1−Ms (so that "0's" become "1's", and "1's" become "0's"). Ms and Ms' can now be considered as two letters of an alphabet, and M as a code word written with these letters. The same coding theory considerations now apply to generate a proper collection of different masks out of the constituents Ms and Ms'. In the case this method is used to generate Col(1) and Col(2), one can either use the same pair for both Col(1) and Col(2) or not. The discussion above the analysis is mostly performed on a single image I.

Next, we consider the case where the detection occurs based on several images. In this case, the determination of customer identity is performed by analyzing several images sold to the same customer and collusion detection is performed by analyzing several corrupted images resulting from the collusion of the same subset of customers. For instance, to identify customers, each customer $C_i$ will be assigned a set of n watermarks W(i), one from each of n collections Col(1), . . . Col(n). The images sold to Ci will each carry one watermark from the set W(i). By analysis of the watermarks on enough images sold to $C_i$, one can determine the identity of $C_i$. One way to get the set W(i) is to randomly choose n watermarks, one from each of the collections Col(1) . . . Col(n) and keeping track of the set W(i) for each customer $C_i$.

In accordance with another embodiment of the present invention, a similar technique is used to detect collusion. For each image $I_j$ sold to customer $C_i$, a watermark is chosen randomly from n collections of watermarks Col(1), . . . , Col(n) and applied to the image. Preferably, n is chosen to be smaller than the number of customers. Further, the owner needs to keep track of which watermark is applied to $I_j$ sold to $C_i$ in a list L. When two customers $C_1$ and $C_2$ collude to attempt to remove the watermark and generate a set of modified images, some images will have the same watermark applied to both $C_1$ and $C_2$ and thus cannot be removed by the collusion attack, as described earlier. By finding the images which have a common watermark, extracting these common watermarks and comparing the results with the list L, it can be determined which of the two customers have been colluding. This idea can easily be used to detect collusion by more than two customers.

As usual, the method described here for images can apply as well to videos or other forms of animated images, or to sounds, by anyone versed in the art.

While the invention has been described in terms of a single preferred embodiment, those skilled in the art will recognize that the invention can be practiced with modification within the spirit and scope of the appended claims.

Having thus described our invention, what we claim as new-and desire to secure by Letters Patent is as follows:

1. A digital watermarking method, comprising the steps of:

forming a first collection of masks;

forming a second collection of masks, each mask in said second collection being different from said masks in said first collection;

assigning to each of a plurality of customers $C_i$ a plurality of pairs of masks (M(K(I,j, 1)), M(K(I,j, 2))), each pair of masks assigned per customer corresponding to a different one of a plurality of digital images $I_j$ offered for use by a vendor, the first mask M(K(I,j, 1) in each pair being derived from said first collection and the second mask M(K(I,j, 2) in each pair being derived from said second collection;

accepting a request to use one of said digital images from one of said customers; and encoding into said digital image requested for use by said one of said customers the pair of masks assigned to said one of said customers in said assigning step which corresponds to the requested digital image, wherein said pair of masks are used to perform a recognition among said plurality of customers so that at most the number of comparative computations is no more than two times the square root of a number of said plurality of customers.

2. The method of claim 1, further comprising the steps of:
obtaining a digital image suspected of being an unauthorized version of the requested digital image;
comparing the masks in said first collection to said suspected digital image on a mask-by-mask basis;
identifying a mask in said first collection which is found in the suspected mask;
comparing the masks in said second collection to said suspected digital image on a mask-by-mask basis;
identifying a mask in said second collection which is found in the suspected mask;
forming the mask identified in said first collection and the mask identified in the second collection into a pair of identified masks;
determining which of said plurality of customers was assigned to said pair of identified masks for the requested digital image; and
identifying the customer assigned to said pair of identified masks for the requested digital image as one responsible for the unauthorized version of the requested digital image.

3. The method of claim 1, wherein said steps of forming said first collection and said second collection include:
a) defining at least one initial mask in a temporary collection;
b) generating a tentative mask as a possible mask to be added to said temporary collection;
c) comparing the tentative mask to the masks already in said temporary collection;
d) rejecting the tentative mask if a predetermined correspondence exists between the tentative mask and any of the masks in said temporary collection;
e) adding the tentative mask to said temporary collection if said predetermined correspondence does not exist;
f) repeating steps b)–e) until a desired number of masks are included in said temporary collection; and
g) dividing the desired number of masks in said temporary collection into two groups corresponding, respectively, to said first collection and said second collection.

4. The method of claim 3, wherein said predetermined correspondence equals a relationship wherein less than one third of values in the tentative mask are different from values in any of the masks in said temporary collection.

5. The method of claim 3, wherein step b) includes:
randomly generating an array of zeros and ones; and
generating said tentative mask from said array.

6. The method of claim 3, wherein said first collection and said second collection contain a same number of masks.

7. The method of claim 2, wherein said first collection of masks and said second collection of masks are disjoint collections having a same number (Elem) of masks, and wherein at most 2×(Elem) comparisons are performed in order to determine which of said plurality of customers was assigned to said pair of identified masks for the requested digital image.

8. The method of claim 7, wherein said comparison comprises a step of detecting whether a watermark generated from a mask is embedded in said digital image.

9. A digital watermarking method, comprising the steps of:
forming a first collection of masks;
forming a second collection of masks, each mask in said second collection being different from said masks in said first collection; and
encoding a pair of masks into a digital image to form an authorized digital image, a first mask of said pair derived from said first collection and a second mask of said pair derived from a second collection, wherein said pair of masks are used to perform a recognition among said plurality of customers that at most the number of comparative computations is no more than two times the square root of a number of said plurality of customers.

10. The method of claim 9, further comprising the steps of:
associating said first mask and said second mask with one of a plurality of customers for said digital image;
obtaining a digital image suspected of being an unauthorized version of said authorized digital image;
locating said first mask and said second mask in said unauthorized digital image; and
identifying the customer assigned to said first mask and said second mask as one who distributed the unauthorized version of said authorized digital image.

11. The method of claim 9, wherein said steps of forming said first collection and said second collection include:
a) defining at least one initial mask in a temporary collection;
b) generating a tentative mask as a possible mask to be added to said temporary collection;
c) comparing the tentative mask to the masks already in said temporary collection;
d) rejecting the tentative mask if a predetermined correspondence exists between the tentative mask and any of the masks in said temporary collection;
e) adding the tentative mask to said temporary collection if said predetermined correspondence does not exist;
f) repeating steps b)–e) until a desired number of masks are included in said temporary collection; and
g) dividing the desired number of masks in said temporary collection into two groups corresponding, respectively, to said first collection and said second collection.

12. The method of claim 11, wherein said predetermined correspondence equals a relationship wherein less than one third of values in the tentative mask are different from values in any of the masks in said temporary collection.

13. A method for detecting when unauthorized digital images have been formed as a result of collusion between customers of a digital image vendor, comprising the steps of:
forming a first collection of masks, said first collection including a sub-collection of a first type and a sub-collection of a second type;
forming a second collection of masks, said second collection including a sub-collection of a first type and a sub-collection of a second type, each mask in said second collection being different from said masks in said first collection;
assigning to each of a plurality of customers $C_i$ a plurality of pairs of masks $(M(K(I,j, 1)), M(K(I,j, 2)))$, each pair of masks assigned per customer corresponding to a different one of a plurality of digital images $I_j$ offered for use by a vendor, the first mask $M(K(I,j, 1))$ in each pair being derived from said first collection and the second mask $M(K(I,j, 2))$ in each pair being derived from said second collection, the first mask and the second mask in each pair either both being of said first type or both being of said second type, wherein said pair of masks will be used to perform a recognition among said plurality of customers so that at most the number of comparative computations is no more than two times the square root of a number of said plurality of customers;

accepting a request to use one of said digital images from one of said customers; and encoding into said digital image requested for use by said one of said customers the pair of masks assigned to said one of said customers in said assigning step which corresponds to the requested digital image.

14. The method of claim 13, wherein said steps of forming said first collection and said second collection include:

a) defining at least one initial mask in a temporary collection;

b) choosing a plurality of patterns for said digital images, each of said patterns be chosen for a subset of pixels in a respective one of said digital images;

c) generating a first tentative mask as a possible mask to be added to said temporary collection;

d) modifying said first tentative mask to carry one of said patterns Pat(j) for a subset $S_j$ of pixels (h,v) within digital image $I_j$;

e) generating a second tentative mask, said second tentative mask being same as said first tentative mask except that said second tentative mask carries a pattern which is an inversion Pat'(j) of the pattern Pat(j) carried by the first tentative mask;

f) comparing the first tentative mask and the second tentative mask to the masks already in said temporary collection;

g) rejecting the first tentative mask and the second tentative mask if a predetermined correspondence exists between at least one of the first tentative mask and the second tentative mask and any of the masks in said temporary collection;

h) adding the first tentative mask and the second tentative mask to said temporary collection if said predetermined correspondence does not exist between both the first tentative mask and the second tentative mask and any of the masks in said temporary collection;

f) repeating steps c)–h) until a desired number of masks are included in said temporary collection; and g) dividing the desired number of masks in said temporary collection into two groups corresponding, respectively, to said first collection and said second collection, wherein the sub-collection of said first type in said first collection and said second collection includes masks which carry patterns Pat(j) and the sub-collection of the second type includes masks which carry patterns Pat'(j).

15. The method of claim 14, further comprising the steps of:

constructing one of the following symbolic sequences $s1(j,C_i)$ for each of said plurality of customers:

$s1(j, C_i)=0$ if $C_i$ has not bought image $I_j$, $s1(j, C_i)=1$ if Image $I_j$ sold to $C_i$ has watermarks of type A, and $s1(j, C_i)=2$ if Image $I_j$ sold to $C_i$ has watermarks of type B;

computing an output $S_j$ for all possible pairs of said plurality of customers based on the symbolic sequences assigned to said customers in said constructing step;

obtaining a digital image suspected of being an unauthorized version of the requested digital image;

comparing the output $S_j$ for all of said possible pairs of customers as determined in said computing step to said suspected digital image; and identifying which two of said customers colluded to produce said unauthorized version of the requested digital image based on an outcome of said comparing step.

16. A method for detecting when unauthorized digital images have been formed as a result of collusion between customers of a digital image vendor, comprising the steps of:

forming a pair of masks where each mask (M) is a two-dimensional concatenation of two smaller masks, a second one of said smaller masks (Ms') being an inversion of a first one of said smaller masks (Ms), said first mask corresponding to a first letter of an alphabet and said second mask corresponding to a second letter of said alphabet, with said pair of masks (M) being a pair of code words written in said first and second letters;

assigning said pair of masks (M) to a customer $C_i$;

accepting a request from said customer $C_i$ to use one of said digital images, encoding said pair of masks (M) into said digital image;

obtaining a digital image suspected of being an unauthorized version of said authorized digital image;

locating said pair of code words corresponding to said pair of masks (M) in said unauthorized digital image; and identifying the customer assigned to said pair of masks having said pair of code words as one who distributed the unauthorized version of said authorized digital image.

17. A watermark detection method, comprising the steps of:

forming n collections of pairs of watermarks;

forming a set of n pairs of watermarks W(I) for a customer, said n pairs of watermarks in said set being chosen one from each said n collections of pairs of watermarks, respectively;

encoding a different one of said pair of watermarks from said set of pairs into a respective plurality of images;

authorizing said customer to use said plurality of images;

obtaining a group of images suspected of being unauthorized versions of said plurality of images;

analyzing watermarks in a predetermined number of said unauthorized versions of said plurality of images; and identifying said group of images as being derived from said customer when, in said analyzing step, watermarks in said predetermined number of said unauthorized versions of said images are determined to belong to said customer.

18. A method for detecting when unauthorized digital images have been formed as a result of collusion between customers of a digital image vendor, comprising the steps of:

forming n collections of pairs of watermarks, where n is less than a number of customers of said vendor;

randomly choosing pairs of watermarks from said n collections of pairs of watermarks;

encoding said randomly chosen pairs of watermarks into respective ones of a plurality of images;

authorizing at least two customers to use said plurality of images, at least a portion of said images used by said two customers being encoded with a common pair of watermark;

obtaining a group of images suspected of being unauthorized versions of said plurality of images;

analyzing said group of images to determine which images in said group have said common pair of watermarks; and identifying said two customers as ones who colluded to produce said unauthorized versions of said plurality of digital images as a result of said common pair of watermarks being found in said group of images.

19. A computer program product for use with a computer, comprising:

a computer readable medium with a computer program recorded thereon, the program including:

first code means for causing the computer to form a first collection of masks;

second code means for causing the computer to form a second collection of masks, each mask in said second collection being different from said masks in said second collection;

third code means for causing the computer to assign to each of a plurality of customers $C_i$ a plurality of pairs of masks (M(K(I,j, 1)), M(K(I,j, 2))), each pair of masks assigned per customer corresponding to a different one of a plurality of digital images $I_j$ offered for use by a vendor, the first mask M(K(I,j, 1) in each pair being derived from said first collection and the second mask M(K(I,j, 2) in each pair being derived from said second collection; and fourth code means for causing the computer to encode into a digital image requested for use by said one of said customers the pair of masks assigned to said one of said customers by said third code means which corresponds to the requested digital image, wherein said pair of masks are used to perform a recognition among said plurality of customers so that at most the number of comparative computations is no more than two times the square root of a number of said plurality of customers.

20. The computer program product of claim 19, further comprising:

fifth code means for causing the computer to compare the masks in said first collection to a suspected digital image on a mask-by-mask basis;

sixth code means for causing the computer to identify a mask in said first collection which is found in the suspected mask;

seventh code means for causing the computer to compare the masks in said second collection to said suspected digital image on a mask-by-mask basis;

eighth code means for causing the computer to identify a mask in said second collection which is found in the suspected mask;

ninth code means for causing the computer to form the mask identified in said first collection and the mask identified in the second collection into a pair of identified masks;

tenth code means for causing the computer to determine which of said plurality of customers was assigned to said pair of identified masks for the requested digital image; and eleventh code means for causing the computer to identify the customer assigned to said pair of identified masks for the requested digital image as one responsible for the unauthorized version of the requested digital image.

* * * * *